US011328023B2

(12) United States Patent
Hecker et al.

(10) Patent No.: US 11,328,023 B2
(45) Date of Patent: May 10, 2022

(54) METHODS, APPARATUSES AND COMPUTER PROGRAM PRODUCTS FOR MANAGING TYPES OF REQUISITIONS THAT DRIVE HIRING WORKFLOWS VIA USER INTERFACES

(71) Applicant: APC Workforce Solutions, LLC, Orlando, FL (US)

(72) Inventors: Nancy Daniel Hecker, Orlando, FL (US); Mark Woytowicz Wyatt, Santa Rosa, CA (US)

(73) Assignee: APC WORKFORCE SOLUTIONS, LLC, Orlando, FL (US)

( * ) Notice: Subject to any disclaimer, the term of this patent is extended or adjusted under 35 U.S.C. 154(b) by 300 days.

(21) Appl. No.: 16/563,392

(22) Filed: Sep. 6, 2019

(65) Prior Publication Data

US 2020/0081920 A1  Mar. 12, 2020

Related U.S. Application Data

(60) Provisional application No. 62/727,919, filed on Sep. 6, 2018.

(51) Int. Cl.
  *G06F 16/00* (2019.01)
  *G06F 16/9035* (2019.01)
  *G06F 16/9038* (2019.01)
  *G06K 9/62* (2022.01)
  *G06Q 10/10* (2012.01)

(52) U.S. Cl.
  CPC ...... *G06F 16/9035* (2019.01); *G06F 16/9038* (2019.01); *G06K 9/6267* (2013.01); *G06Q 10/1053* (2013.01)

(58) Field of Classification Search
  CPC ........... G06F 16/9035; G06F 16/9038; G06K 9/6267; G06Q 10/1053
  See application file for complete search history.

(56) References Cited

U.S. PATENT DOCUMENTS

| 10,223,671 | B1* | 3/2019 | Toomey | G06Q 10/1053 |
| 2008/0208907 | A1* | 8/2008 | Tolve | G06Q 10/06 |
| 2010/0169143 | A1* | 7/2010 | Carr | G06Q 10/10 |
| | | | | 705/7.21 |

(Continued)

OTHER PUBLICATIONS

International Search Report and Written Opinion issued in PCT/US2019/049910, dated Dec. 10, 2019.

(Continued)

*Primary Examiner* — Jared M Bibbee
(74) *Attorney, Agent, or Firm* — BakerHostetler

(57) ABSTRACT

Methods, apparatuses, and computer program products are provided for managing and generating types of requisitions via user interfaces. A method may include generating a user interface wizard comprising one or more questions associated with respective requisition types to generate corresponding requisitions in response to receiving a request to create a requisition, and in response to detecting at least one answer to at least one of the questions, automatically identifying one or more associated requisition types and corresponding job classifications presented in a requisition type user interface for selection in order to create a respective requisition.

20 Claims, 15 Drawing Sheets

(56) References Cited

U.S. PATENT DOCUMENTS

| | | | |
|---|---|---|---|
| 2011/0131146 A1* | 6/2011 | Skutnik | G06Q 10/1053 |
| | | | 705/321 |
| 2013/0085954 A1* | 4/2013 | Hanneman | G06Q 10/105 |
| | | | 705/321 |
| 2014/0297550 A1* | 10/2014 | Miller | G06Q 50/01 |
| | | | 705/321 |
| 2015/0032654 A1* | 1/2015 | Huff | G06Q 10/105 |
| | | | 705/320 |
| 2015/0186846 A1* | 7/2015 | Menon | G06Q 10/1053 |
| | | | 705/321 |
| 2015/0186847 A1* | 7/2015 | Menon | G06Q 10/1053 |
| | | | 705/321 |
| 2016/0026347 A1* | 1/2016 | Gehring | G06F 21/31 |
| | | | 715/810 |
| 2016/0125360 A1* | 5/2016 | Ali | G06Q 10/1053 |
| | | | 705/321 |
| 2017/0039508 A1* | 2/2017 | French | G06Q 10/04 |
| 2017/0132571 A1* | 5/2017 | Stock | G06Q 10/1053 |
| 2018/0096307 A1* | 4/2018 | Fortier | G06N 5/022 |
| 2018/0232683 A1* | 8/2018 | Chuang | G06Q 10/1053 |
| 2018/0336528 A1* | 11/2018 | Carpenter | G06F 16/3334 |
| 2020/0005243 A1* | 1/2020 | Pong | G06Q 10/063112 |

OTHER PUBLICATIONS

International Preliminary Report on Patentability issued in PCT/US2019/049910, dated Jan. 15, 2021.

* cited by examiner

Requisition Types

| Division ▼ | Approval Work Flow ▼ | Track Codes ▼ | Module ▼ | Requisitions ▼ | Documents | Reductions | Scheduled Events |
|---|---|---|---|---|---|---|---|
| Misc Document | History | | | | | | |

Customer Name: _____   Division Name: _____

▽ Manage Requisition Type

Status [Active ▼]   Name: _____

[ Add New Requisition Type | Search ]

▽ Requisition Types

| Requisition Type ID | Requisition Type | Requisition Type Group | Wizard Question [English (United States) ▼] | Active |
|---|---|---|---|---|
| 2774 | Administrative positions | Staff Augmentation | Are you modest securing an agency temp to perform job duties on an hourly basis where work will be directed by our employee? | Yes |
| 1479 | Independent Contractor | SOW | Are you contracting with a third-party to complete a project with specific deliverables and due dates? (Default) | Yes |
| 1310 | Seasonal positions | Staff Augmentation | Are you hiring a temporary resource whose job duties will be directed by our employee? (Default) | Yes |
| 2775 | Vendor | SOW | Are you modest securing work directly to a service provider whose work will be directed by the service provider and not by our employee? | Yes |

Page size [50 ▼]   items 1 to 4 of 4

[ Back ]

Figure 5:
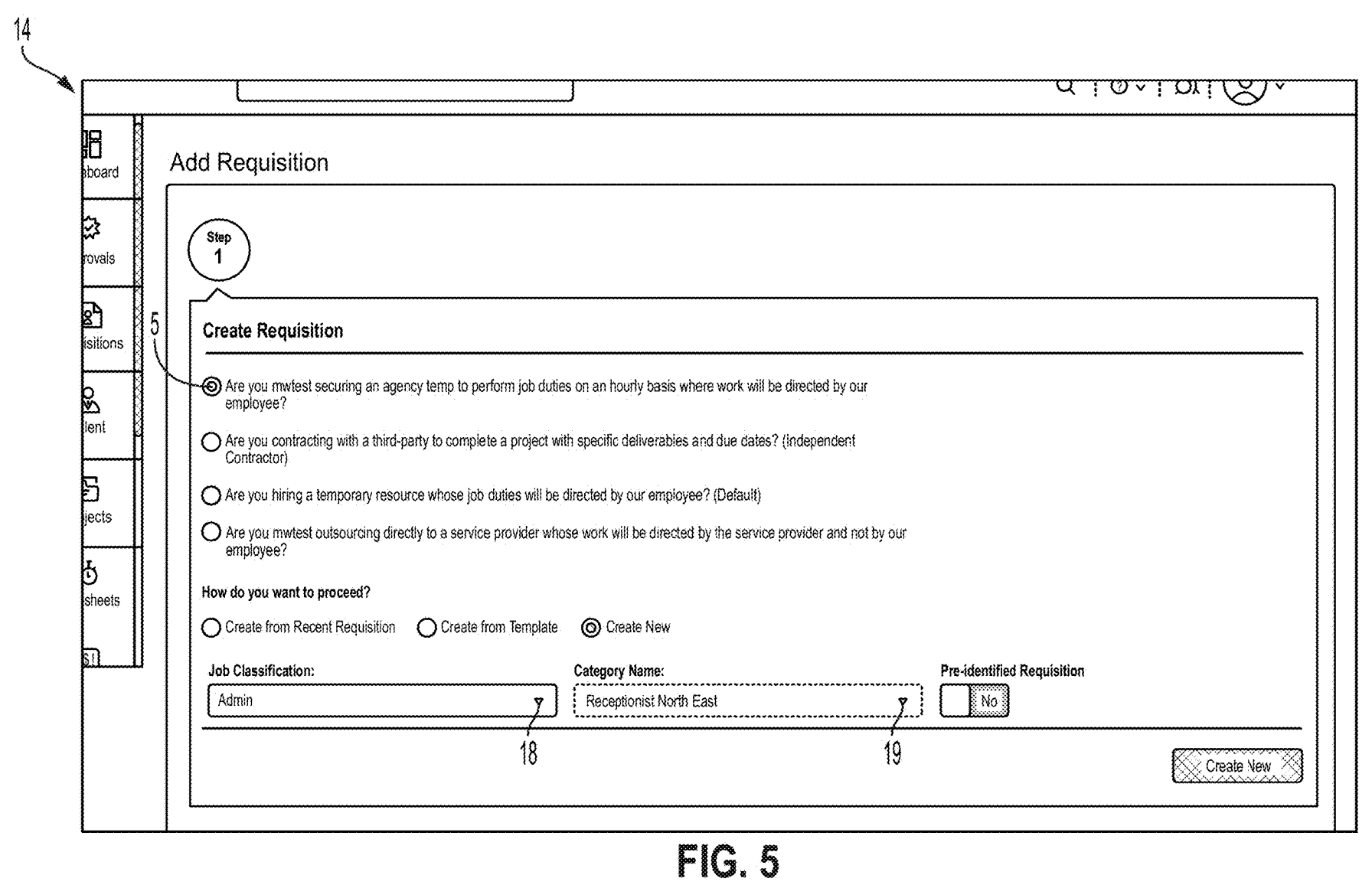

Add Requisition

Step 1

Create Requisition

◉ Are you m/test securing an agency temp to perform job duties on an hourly basis where work will be directed by our employee?

○ Are you contracting with a third-party to complete a project with specific deliverables and due dates? (Independent Contractor)

○ Are you hiring a temporary resource whose job duties will be directed by our employee? (Default)

○ Are you m/test outsourcing directly to a service provider whose work will be directed by the service provider and not by our employee?

How do you want to proceed?

○ Create from Recent Requisition   ○ Create from Template   ◉ Create New

Job Classification:  
Admin ▼ — 18

Category Name:  
Receptionist North East ▼ — 19

Pre-identified Requisition  
[ No ]

[Create New]

METHODS, APPARATUSES AND COMPUTER PROGRAM PRODUCTS FOR MANAGING TYPES OF REQUISITIONS THAT DRIVE HIRING WORKFLOWS VIA USER INTERFACES

CROSS-REFERENCE TO RELATED APPLICATIONS

This application claims the benefit of U.S. Provisional Patent Application No. 62/727,919, filed on Sep. 6, 2018, entitled "Methods, Apparatuses And Computer Program Products For Requisition Types That Drive Hiring Workflows," the contents of which are hereby incorporated by reference herein in its entirety.

TECHNICAL FIELD

Exemplary embodiments of the present disclosure relate generally to methods, apparatuses, and computer program products for improving techniques of managing types of requisitions via user interfaces.

BACKGROUND

One manner in which to supplement an existing work force is for organizations (e.g., corporations, institutions (e.g., universities), other businesses) to hire one or more independent contractors to assist with professional service needs of an organization. Professional services may involve using specialists to support the business by providing tax advice, accounting assistance, information technology (IT) services assistance, providing management advice, etc. Another way to supplement an existing work force is for organizations to hire one or more contingent workers (e.g., independent contractors) to assist with a variety of tasks limited to a certain period of time based on the needs (e.g., staff augmentation) of the organization.

A job requisition may be used by an employee of an organization to request supplemental work assistance. The job requisition may describe why the supplemental work assistance is needed, tasks to be completed, desired experience and establish a budget available for the role.

SUMMARY

A method, apparatus and computer program product are therefore provided for providing improved techniques of managing types of requisitions associated with various job classifications for generating requisitions via user interfaces, as described more fully below.

The exemplary embodiments may also generate user interfaces to enable selections and input for generating requisition types according to the needs of customers.

In one example embodiment, an apparatus for generating a requisition via user interfaces is provided. The apparatus may include a processor and a memory including computer-executable instructions. The memory and the computer-executable instructions are configured to, with the processor, cause the apparatus to at least perform operations including generate, via a user interface, a user interface wizard comprising one or more questions associated with respective requisition types to generate corresponding requisitions in response to receiving a request to create a requisition. The memory and computer-executable instructions are also configured to cause the apparatus to at least perform further operations of, in response to detecting at least one answer to at least one of the questions, automatically identifying one or more associated requisition types and corresponding job classifications presented in a requisition type user interface for selection in order to create a respective requisition.

In another example embodiment, a method for generating a requisition via user interfaces is provided. The method may include generating, via a user interface, a user interface wizard comprising one or more questions associated with respective requisition types to generate corresponding requisitions in response to receiving a request to create a requisition. The method may further include, in response to detecting at least one answer to at least one of the questions, automatically identifying one or more associated requisition types and corresponding job classifications presented in a requisition type user interface for selection in order to create a respective requisition.

In another example embodiment, a computer program product for generating a requisition via user interfaces is provided. The computer program product includes at least one computer-readable storage medium having computer-executable program code instructions stored therein. The computer-executable program code instructions may include program code instructions configured to generate, via a user interface, a user interface wizard comprising one or more questions associated with respective requisition types to generate corresponding requisitions in response to receiving a request to create a requisition. The computer program product may further include program code instructions configured to, in response to detecting at least one answer to at least one of the questions, automatically identifying one or more associated requisition types and corresponding job classifications presented in a requisition type user interface for selection in order to create a respective requisition.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 3 is a diagram illustrating an exemplary user interface according to an exemplary embodiment of the present disclosure;

FIG. 4 is a diagram illustrating an exemplary user interface according to an exemplary embodiment of the present disclosure;

FIG. 5 is a diagram illustrating an exemplary user interface according to an exemplary embodiment of the present disclosure;

FIG. 6 is a diagram illustrating an exemplary user interface according to an exemplary embodiment of the present disclosure;

FIG. 7 is a diagram illustrating an exemplary user interface according to an exemplary embodiment of the present disclosure;

FIG. 8A is a diagram illustrating an exemplary user interface according to an exemplary embodiment of the present disclosure;

FIG. 8B is a diagram illustrating an exemplary user interface according to an exemplary embodiment of the present disclosure;

FIG. 9 is a diagram illustrating an exemplary user interface according to an exemplary embodiment of the present disclosure;

FIG. 12B is a diagram illustrating an exemplary user interface according to an exemplary embodiment of the present disclosure; and FIG. 12C is a diagram illustrating an exemplary user interface according to an exemplary embodiment of the present disclosure.

DETAILED DESCRIPTION OF ILLUSTRATIVE EMBODIMENTS

Figure 1:
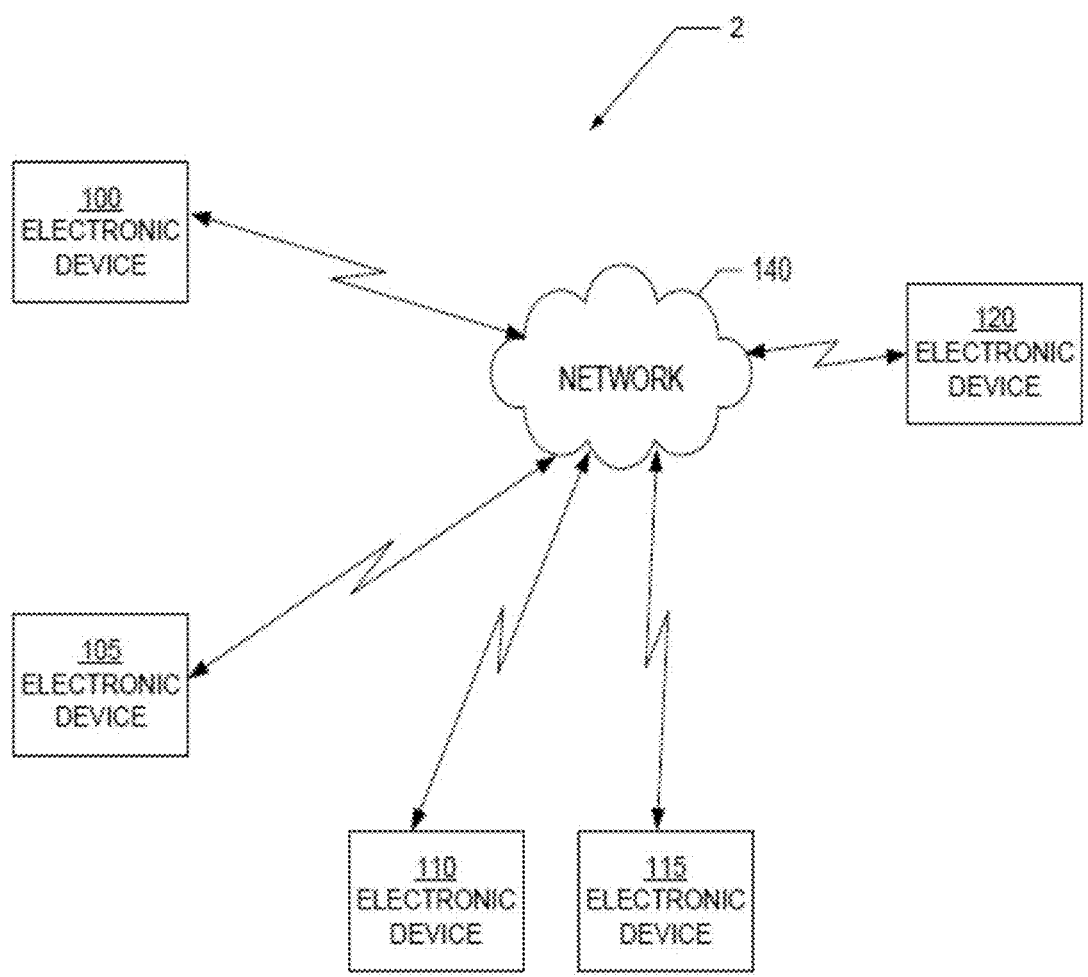
FIG. 1 is a schematic block diagram of a system according to an exemplary embodiment of the present disclosure.

Some embodiments of the present disclosure will now be described more fully hereinafter with reference to the accompanying drawings, in which some, but not all embodiments of the present disclosure are shown. Indeed, various embodiments of the present disclosure may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present disclosure. Moreover, the term "exemplary", as used herein, is not provided to convey any qualitative assessment, but instead merely to convey an illustration of an example. Thus, use of any such terms should not be taken to limit the spirit and scope of embodiments of the present disclosure.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a contingent worker(s) may refer to an independent contractor(s), consultant(s), freelancer(s), or other outsourced and non-permanent worker(s) hired on a per-project basis.

As referred to herein, a requisition type(s) may refer to a set of workflow rule settings for generating a requisition(s) via a user interface(s). In some example embodiments, each requisition may be associated with a requisition type at the outset of a requisition creation workflow.

It is to be understood that the methods and systems described herein are not limited to specific methods, specific components, or to particular implementations. It is also to be understood that the terminology used herein is for the purpose of describing particular embodiments only and is not intended to be limiting.

A job requisition may be a document used to request hiring of one or more individuals (e.g., permanent and/or temporary workers), describing the manner in which the hiring of one or more individuals is needed and may describe the budget available for a role/position. The job requisition may require approval from management and human resources of an organization before proceeding with filling the role. When utilizing a computer assisted staffing request to initiate and process a job requisition in some existing systems, an entity (e.g., a hiring manager) may not know how to fill out the job requisition properly leading to a delay in the hiring process and frustration of the entity. For example, the entity may be unfamiliar with requisition types or designations used to create requisitions, which may lead to the entity (e.g., manager) using the wrong requisition types or designations thereby causing the created requisition to be incorrect in these existing systems. Moreover, in some existing systems, job classifications associated with the requisition may only have one requisition type. Therefore, requisitions can be rejected by management and human resources of an organization because the requisition was not completed correctly by an entity (e.g., a manager).

Accordingly, a system that facilitates the identification of a requisition's requisition type during a requisition creation process, for example via selection from a list of graphical prompts (e.g., descriptive textual prompts, icons, etc.) may be beneficial.

Various exemplary embodiments of the present invention relate generally to automating managing of different types of requisitions via one or more graphical user interfaces. Applicant has identified that some existing systems utilize techniques that may generate only one type of requisition (e.g., a requisition tailored for the information technology industry) based on a particular selected job classification (e.g., technical support specialist). Generating one type of requisition for a selected job classification may cause a device to generate and present an inadequate type of requisition in some instances since the requisition may not be the correct type desired by a user. In this regard, users of devices may make several different selections of job classifications and may be presented with several different corresponding types of requisitions for evaluating whether a particular requisition is suitable for the intended purpose. Making various selections of job classifications to be presented via a display with different types of requisitions in order for a user to decide on a suitable type of requisition inefficiently consumes processing resources (e.g., processing capacity) of a device by causing a device to detect the various selections of job classifications and present different types of requisitions to a display for consideration by a user so that the user can determine suitability. Storing these selections of job classifications in order to subsequently present different types of requisitions may also constrain memory of storage devices. Applicant has identified that conserving processing resources and memory space are important to improving any implementation of automated management of types of requisitions via graphical user interfaces, in addition to providing a more efficient manner for obtaining supplemental work assistance.

Example embodiments may utilize one or more graphical user interfaces that enables dynamic (e.g., in real-time) determination of an appropriate type of requisition by a computing device based in part on detecting one or more answers to tailored questions detected via a user interface in lieu of selection of a job classification as in some existing systems. By utilizing these graphical user interfaces to enable dynamic determination of an appropriate type of requisition based on answers to tailored questions, prior to being presented with the type of requisition, the exemplary embodiments may conserve processing capacity and memory storage of memory devices by minimizing any need to make multiple selections of different job classifications to be presented various different types of requisitions, at different times, in order for a user to decide on an appropriate type of requisition.

As such, systems in accordance with various exemplary embodiments of the invention provide specific, technical solutions to technical problems faced by some systems.

General System Architecture

Reference is now made to FIG. 1, which is a block diagram of a system according to exemplary embodiments. As shown in FIG. 1, the system 2 may include one or more communication devices 100, 105, 110, 115, and 120 (e.g., personal computers, laptops, workstations, servers, personal digital assistants, smart devices and the like, etc.) which may communicate with each other over a network 140, such as a wired local area network (LAN) or a wireless local area network (WLAN), a metropolitan network (MAN) and/or a wide area network (WAN) (e.g., the Internet). In this regard, the electronic devices 100, 105, 110, 115 and 120 are capable of receiving data from and transmitting data via network 140.

In one exemplary embodiment, the electronic devices 100, 105, 110, 115, and 120 may be utilized by users of entities to manage one or more requisitions and to configure options for the requisitions, as described more fully below.

It should be pointed out that although FIG. 1 shows five electronic devices 100, 105, 110, 115, and 120 any suitable number of electronic devices 100, 105, 110, 115, and 120 may be part of the system of FIG. 1 without departing from the spirit and scope of the present disclosure.

Computing Device

Figure 2:
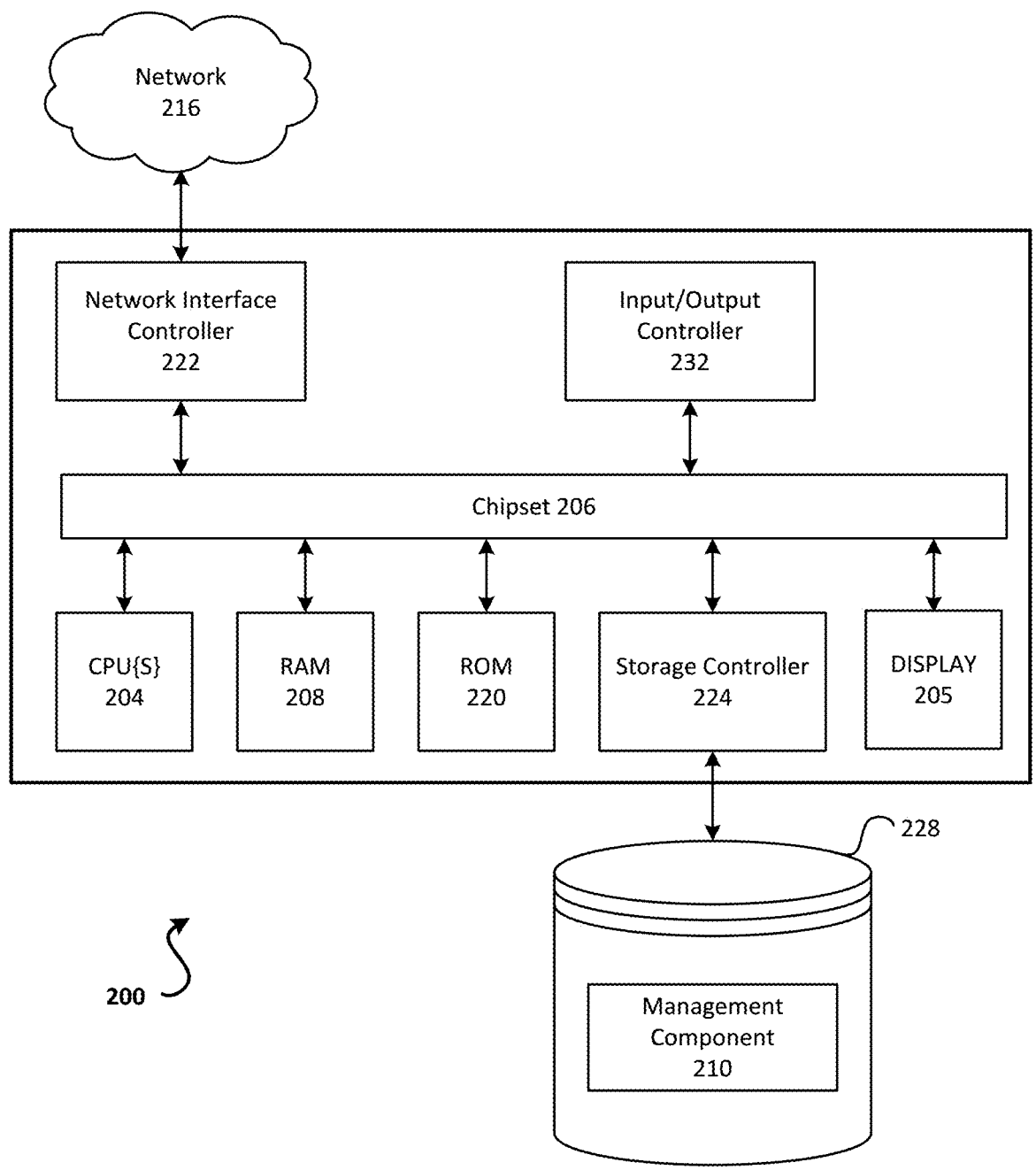
FIG. 2 is a block diagram illustrating an example computing device.

FIG. 2 depicts a computing device that may be used in various aspects, such as the servers, modules, and/or devices depicted in FIG. 1. With regard to the example architecture of FIG. 1, the electronic devices 100, 105, 110, 115 and 120 may each be implemented in an instance of a computing device 200 of FIG. 2. The computer architecture shown in FIG. 2 may illustrate a server computer, workstation, desktop computer, laptop, tablet, network appliance, PDA, e-reader, digital cellular phone, or other computing node, and may be utilized to execute any aspects of the computers described herein, such as to implement the methods described herein.

The computing device 200 may include a baseboard, or "motherboard," which is a printed circuit board to which a multitude of components or devices may be connected by way of a system bus or other electrical communication paths. One or more central processing units (CPUs) 204 may operate in conjunction with a chipset 206. The CPU(s) 204 may be standard programmable processors that perform arithmetic and logical operations necessary for the operation of the computing device 200.

The CPU(s) 204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 204 may be augmented with or replaced by other processing units, such as GPU(s) 205. The GPU(s) 205 may comprise processing units specialized for but not necessarily limited to highly parallel computations, such as graphics and other visualization-related processing.

A chipset 206 may provide an interface between the CPU(s) 204 and the remainder of the components and devices on the baseboard. The chipset 206 may provide an interface to a random-access memory (RAM) 208 used as the main memory in the computing device 200. The chipset 206 may further provide an interface to a computer-readable storage medium, such as a read-only memory (ROM) 220 or non-volatile RAM (NVRAM) (not shown), for storing basic routines that may help to start up the computing device 200 and to transfer information between the various components and devices. ROM 220 or NVRAM may also store other software components necessary for the operation of the computing device 200 in accordance with the aspects described herein.

The computing device 200 may operate in a networked environment using logical connections to remote computing nodes and computer systems through local area network (LAN) 216. The chipset 206 may include functionality for providing network connectivity through a network interface controller (NIC) 222, such as a gigabit Ethernet adapter. A NIC 222 may be capable of connecting the computing device 200 to other computing nodes over a network 216. It should be appreciated that multiple NICs 222 may be present in the computing device 200, connecting the computing device to other types of networks and remote computer systems.

The computing device 200 may be connected to a mass storage device 228 that provides non-volatile storage for the computer. The mass storage device 228 may store system programs, application programs, other program modules, and data, which have been described in greater detail herein. The mass storage device 228 may be connected to the computing device 200 through a storage controller 224 connected to the chipset 206. The mass storage device 228 may consist of one or more physical storage units. A storage controller 224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 200 may store data on a mass storage device 228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 228 is characterized as primary or secondary storage and the like.

For example, the computing device 200 may store information to the mass storage device 228 by issuing instructions through a storage controller 224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 200 may further read information from the mass storage device 228 by detecting the physical states or characteristics of one or more particular locations within the physical storage units.

In addition to the mass storage device 228 described above, the computing device 200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 228 depicted in FIG. 2, may store an operating system utilized to control the operation of the computing device 200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 228 may store other system or application programs and data utilized by the computing device 200.

The mass storage device 228 or other computer-readable storage media may also be encoded with computer-executable instructions, which, when loaded into the computing device 200, transforms the computing device from a general-purpose computing system into a special-purpose computer capable of implementing the aspects described herein. These computer-executable instructions transform the computing device 200 by specifying how the CPU(s) 204 transition between states, as described above. The computing device 200 may have access to computer-readable storage media storing computer-executable instructions, which, when executed by the computing device 200, may perform methods described herein.

A computing device, such as the computing device 200 depicted in FIG. 2, may also include an input/output controller 232 for receiving and processing input from a number of input devices, such as a keyboard, a mouse, a touchpad, a touch screen, an electronic stylus, or other type of input device. Similarly, an input/output controller 232 may provide output to a display 205, such as a computer monitor, a flat-panel display, a digital projector, a printer, a plotter, or other type of output device. It will be appreciated that the computing device 200 may not include all of the components shown in FIG. 2, may include other components that are not explicitly shown in FIG. 2, or may utilize an architecture completely different than that shown in FIG. 2.

As described herein, a computing device may be a physical computing device, such as the computing device 200 of FIG. 2. A computing node may also include a virtual machine host process and one or more virtual machine instances. Computer-executable instructions may be executed by the physical hardware of a computing device indirectly through interpretation and/or execution of instructions stored and executed in the context of a virtual machine.

Exemplary System Operation

Exemplary embodiments of the present disclosure provide an efficient and reliable mechanism for managing and generating requisition types (also referred to herein as types of requisitions) associated with various job classifications, as described more fully below. Typically, to be viable, a job classification (e.g., administration, engineering, finance, etc.) may need to be associated with a requisition type to generate a requisition. In conventional systems, a job classification (e.g., engineering) may initially be associated with only one requisition type such that as soon as the job classification was selected from a user interface at the outset of a requisition creation workflow, a corresponding requisition type (e.g., a requisition type tailored for the engineering industry) may be generated for presentation to the user interface. As such, the requisition type may not need to be exposed/presented, in a user interface, to users (e.g., customers) since one requisition type is typically automatically selected based on the job classification. It may be beneficial to provide an efficient and reliable mechanism for a job classification to be associated with more than one requisition type and for providing a user interface wizard that guides users to appropriate requisition types.

The exemplary embodiments of the present disclosure may provide a user interface wizard (also referred to herein as a requisition type wizard) for a requisition creation workflow process that enables selection of an appropriate requisition type based in part on answers to descriptive questions in lieu of selection of a job classification. Enabling selection of a requisition type based in part on answers to descriptive questions, enables filtering of associated job classification options. In this manner, exemplary embodiments of the present disclosure allow a job classification to be associated with more than one requisition type, as described more fully below. In some exemplary embodiments, a user interface wizard may identify both a requisition type(s) and a job classification(s) of a requisition.

Referring now to FIG. 3, a diagram illustrating a requisition type wizard interface according to an example embodiment is provided. In the example embodiment of FIG. 3, the computing device 200 may generate the requisition type wizard interface 5 (also referred to herein as requisition type wizard 5) during a requisition creation workflow process. The requisition creation workflow process may be initiated by a user clicking on a 'Create Requisition' menu option via the requisition type wizard interface 5. In the example embodiment of FIG. 3, the computing device included requisition types in the requisition type wizard interface 5 associated with administrative positions (corresponding to a Staff Augmentation requisition type group), independent contractors (corresponding to a Statement of Work (SOW) requisition type group), seasonal positions (corresponding to a Staff Augmentation requisition type group) and a vendor(s) (corresponding to a SOW requisition type group). It should be pointed out that other requisition types (e.g., engineering positions, finance positions, etc.) may be included in the requisition type wizard interface 5 without departing from the spirit and scope of the invention. The computing device 200 generated the requisition type wizard interface 5 with two requisition type groups such as SOW and Staff Augmentation. SOW may be applicable to contract labor such as, for example, an independent contractor(s) and Staff Augmentation may be applicable to temporary workers whose employer of record may be a staffing supplier. In some other exemplary embodiments, the computing device 200 may generate a requisition type wizard interface with more than two requisition type groups.

In the requisition type wizard interface 5 of FIG. 3, wizard questions 9 are set as active for selection by a user(s) in order to present/provide one or more associated requisition types to the user(s), as described more fully below.

Figure 4:
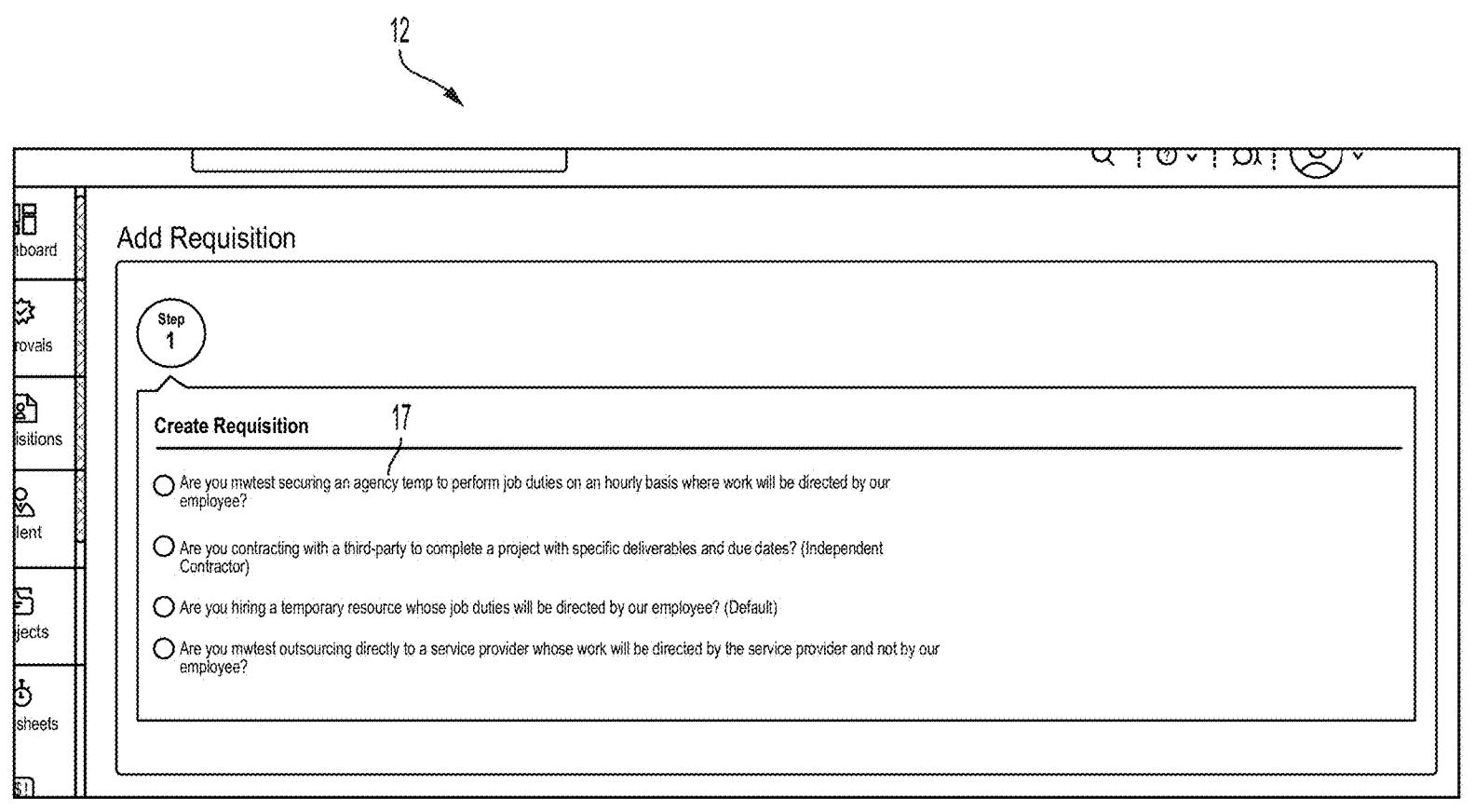

Referring now to FIG. 4, a diagram illustrating a create requisition user interface is provided according to an example embodiment. In the example embodiment of FIG. 4, the computing device 200 may generate the create requisition user interface 12 as a first step in selecting requisition type wizard questions (e.g., wizard questions 9) for creating a new requisition type (e.g., an administrative position requisition type). In the create requisition user interface 12, wizard questions corresponding to each active requisition type are displayable for selection in an instance in which a new requisition is being created. In response to detecting a selection of one of the wizard questions (e.g., wizard question 17) from the create requisition user interface 12, the computing device 200 may generate a wizard user interface 14 to select one or more job classifications (e.g., administrative (admin)) from the job classification tab 18 to assign to the requisition type (e.g., an administrative position requisition type) being created and for selecting one or more job categories (e.g., receptionist) from the job category tab 19 that are associated with the selected job classification to assign to the requisition type, as shown in FIG. 5.

Figure 6:
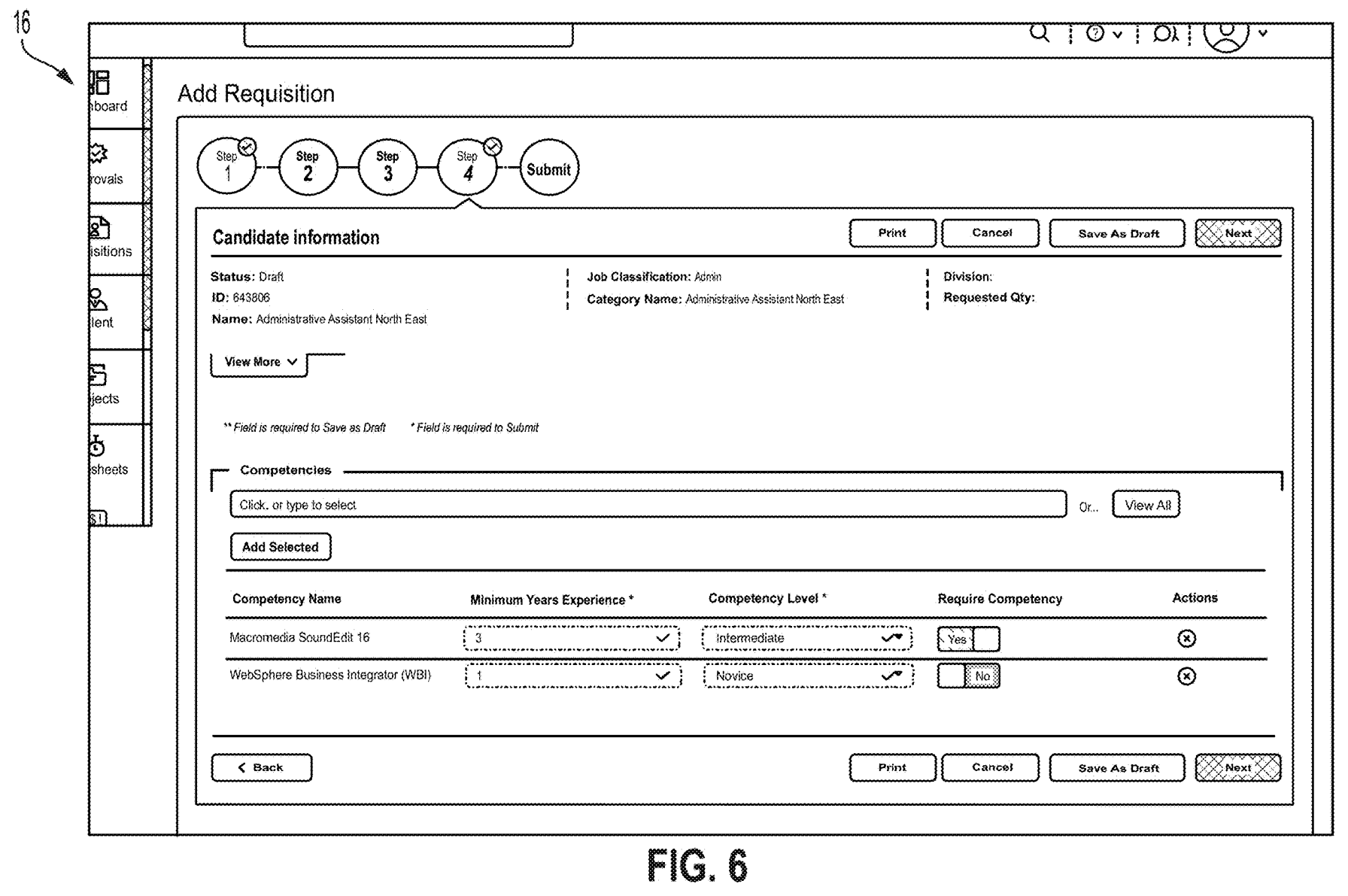

In an example embodiment, a user competencies setting (e.g., user competencies setting 21 of FIG. 9) may be on and activated for the requisition type (e.g., an administrative position requisition type) being created. As such, the computing device 200 may generate a competencies panel 16 (also referred to herein as competencies user interface 16) for display, as shown in FIG. 6. The competencies of the competencies panel 16 may correspond to one or more skills associated with a job position corresponding to a requisition.

Figure 7:
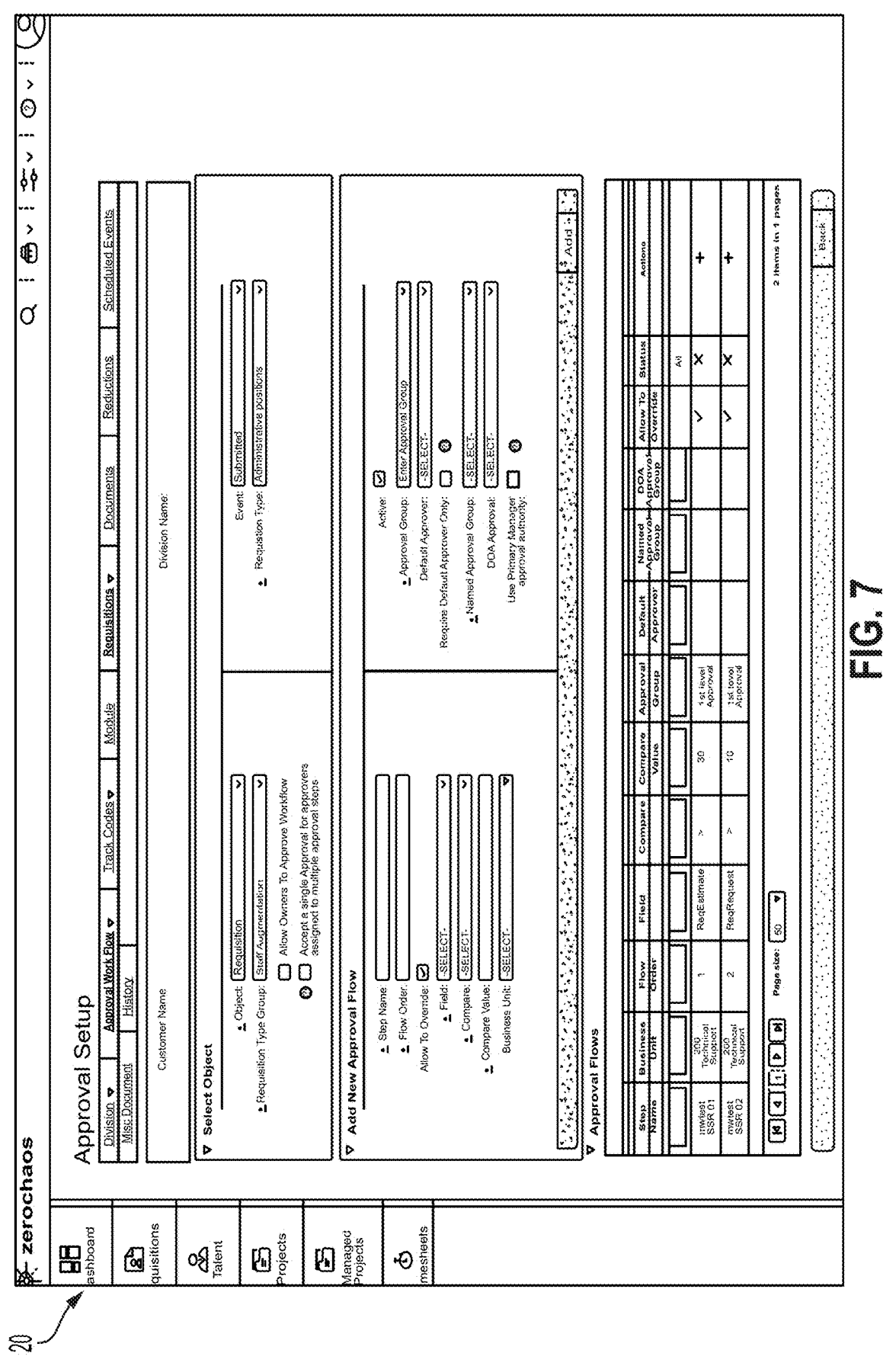

Referring now to FIG. 7, a diagram illustrating an approval workflow user interface is provided according to an example embodiment. In the example embodiment of FIG. 7, the computing device 200 may generate the approval workflow user interface 20. The approval workflow user interface 20 establishes an approval workflow for a particular requisition type (e.g., an administrative position requisition type) with user interface configurations that are dependent on the particular requisition type.

Figure 8A:
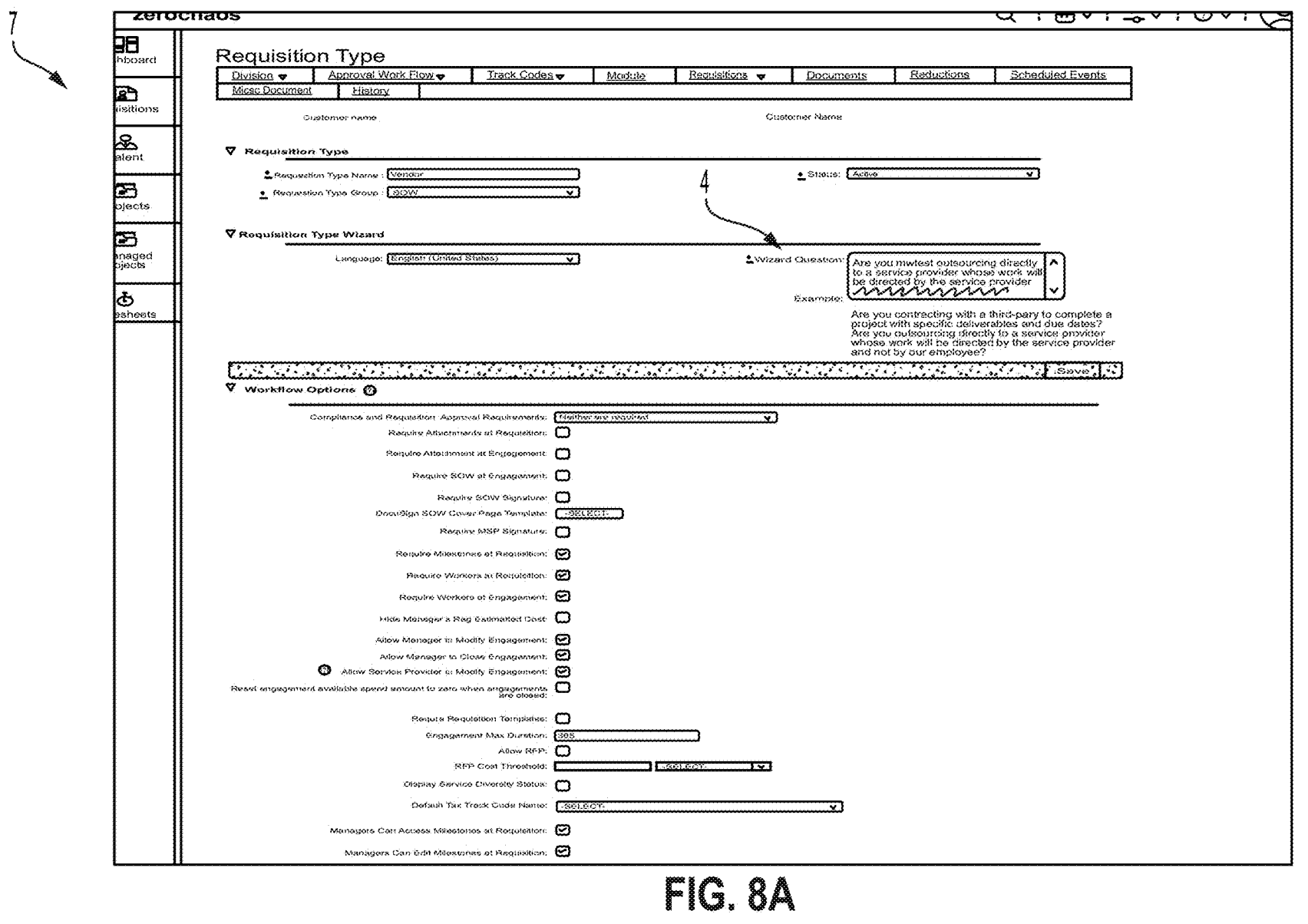
Figure 8B:
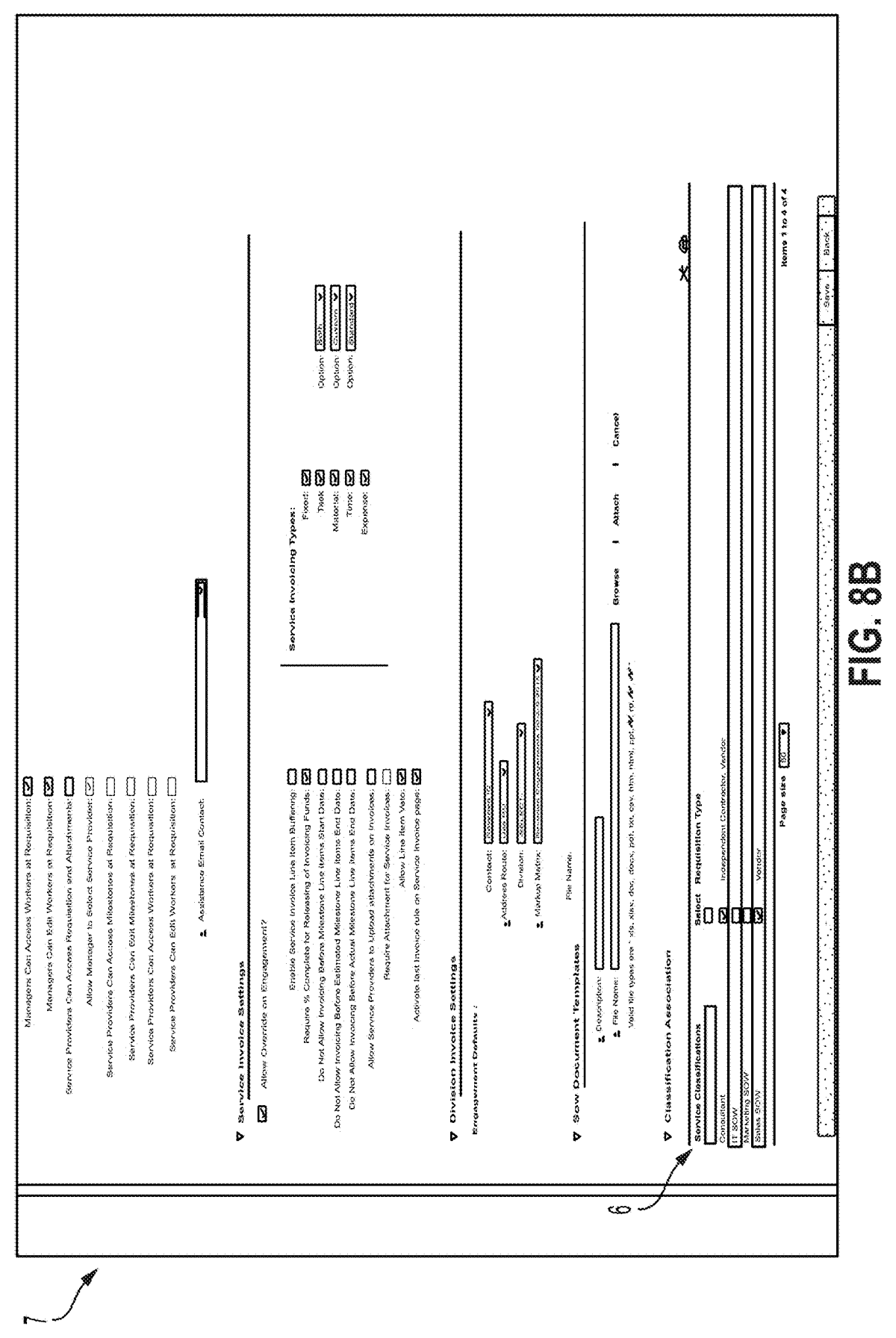

Referring now to FIGS. 8A and 8B, diagrams illustrating a wizard interface 7 with the requisition type workflow settings for one of the SOW requisition type groups (e.g., associated with requisition type vendor) is provided according to an exemplary embodiment. In the example of FIGS. 8A and 8B, the wizard interface 7 may be associated with wizard question(s) 4 and may be configured along with various workflow settings and job classifications (also referred to herein as service classifications) associations 6. In the exemplary wizard interface 7, the computing device 200 may determine that the job classification consultant, of the job classifications associations 6, is associated with multiple requisition types (e.g., independent contractor and vendor), as shown in FIG. 8B. As such, for purposes of illustration and not of limitation, in an instance in which a user selects wizard question 1 or wizard question 3 (see e.g., FIG. 3) from a requisition type interface, the computing device 200 may (automatically) select and present a requisition interface with two requisition types (e.g., the independent contractor requisition type and the vendor requisition type) to the user.

Figure 9:
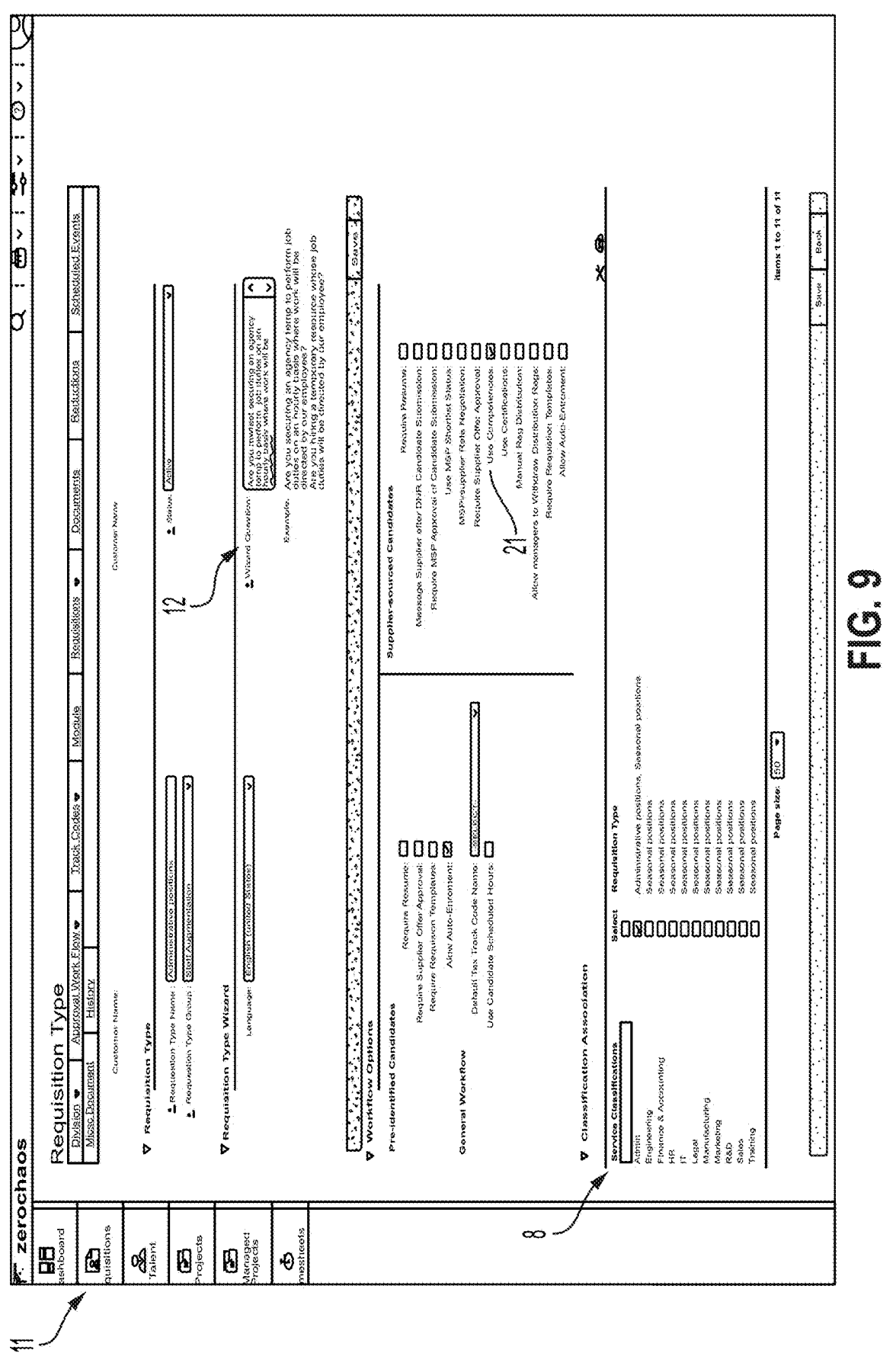

Referring now to FIG. 9, a diagram illustrating a wizard interface 11 with the requisition type workflow settings for one of the Staff Augmentation requisition type groups (e.g., associated with administrative positions) is provided according to an exemplary embodiment. In the example of FIG. 9, the wizard interface 11 may be associated with wizard question(s) 12 and may be configured along with various workflow settings and job classifications (also referred to herein as service classifications) associations 8. In the exemplary wizard interface 11, the computing device 200 may determine that the job classification (e.g., admin), of the job classifications associations 8, is associated with multiple requisition types (e.g., administrative positions, seasonal positions), as shown in FIG. 9.

Figure 10:
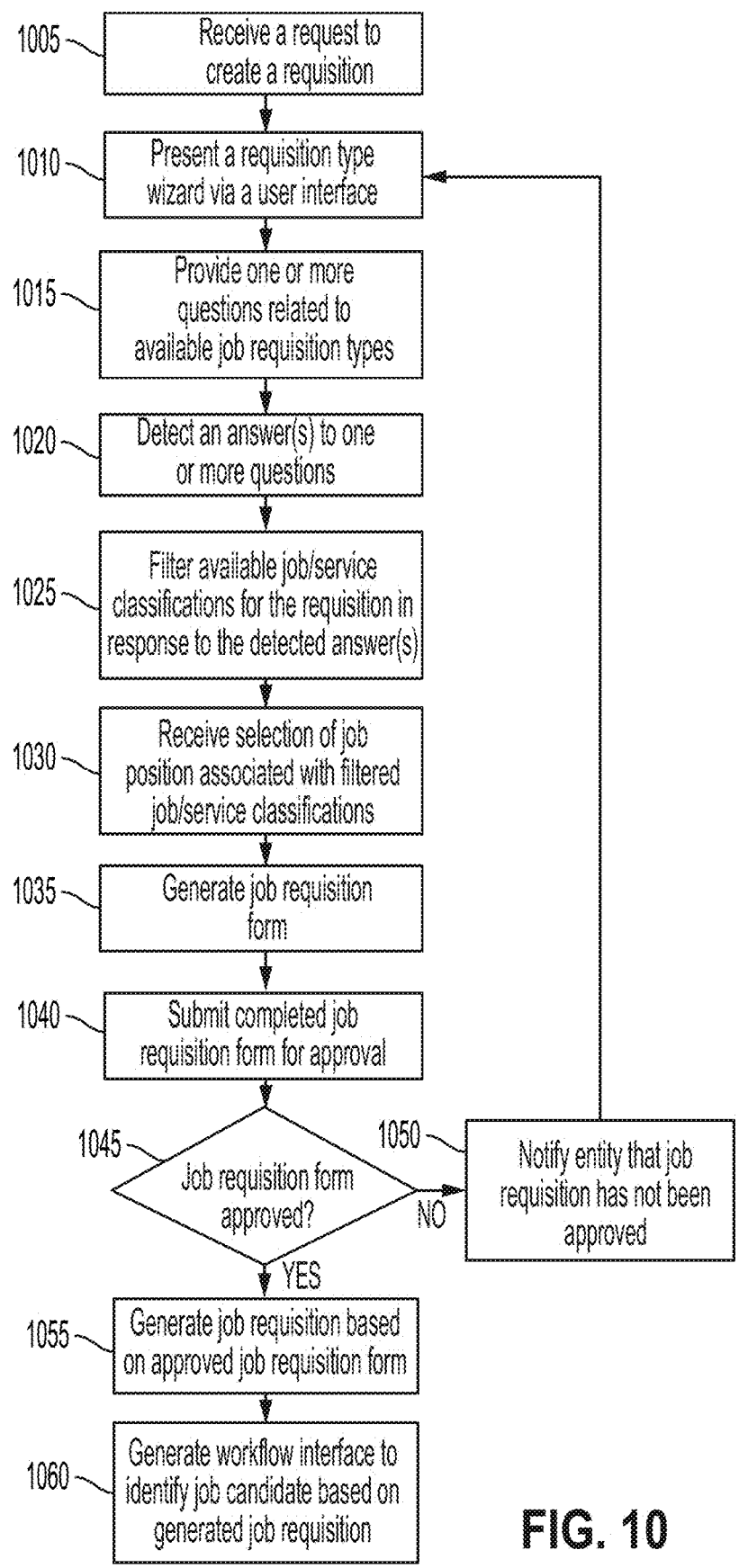
FIG. 10 is a flow diagram illustrating an exemplary method for generating a job requisition using a requisition creation workflow user interface according to one more exemplary embodiments of the present disclosure.
Figure 12A:
FIG. 12A is a diagram illustrating an exemplary user interface according to an exemplary embodiment of the present disclosure.
Figure 12B:
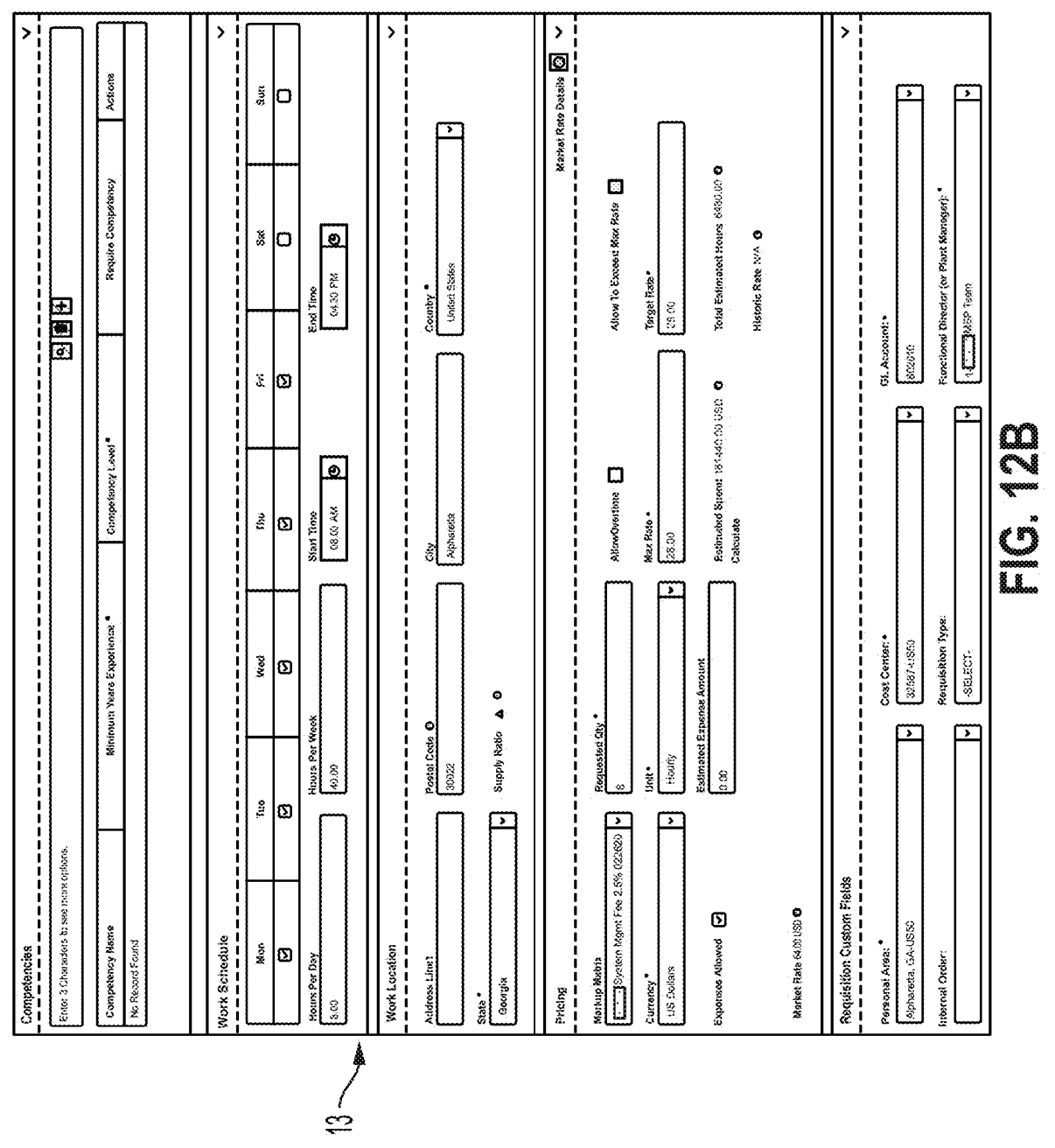
Figure 12C:
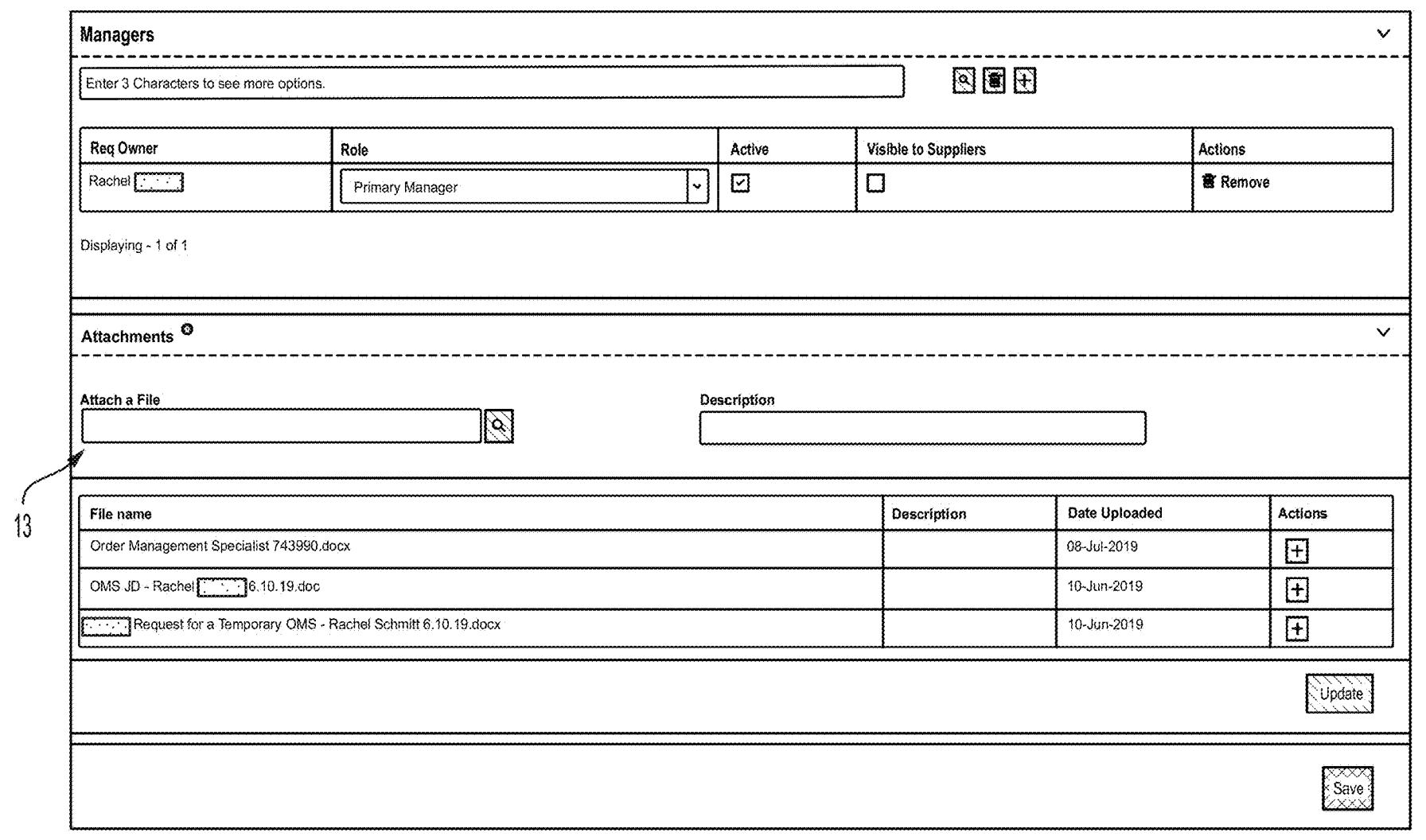

FIG. 10 is an exemplary flow diagram illustrating an exemplary method for generating a requisition according to one or more exemplary embodiments. At operation 1005, an apparatus (e.g., computing device 200) may receive/detect a request to create a requisition (e.g., a job requisition). In one example embodiment, the apparatus may detect a request to create a requisition in response to detection of a request (e.g., via a generated message) to create a requisition sent by an electronic device (e.g., electronic device 100) of an entity (e.g., a hiring manager). At operation 1010, an apparatus (e.g., computing device 200) may generate a requisition type wizard interface (e.g., requisition type wizard interface 5) in response to the receipt/detection of the request to create the requisition (e.g., a job requisition). The generated requisition type wizard interface may be provided to a display device (e.g., display 205) for display. At operation 1015, the requisition type wizard interface may present a user interface (e.g., create user interface 12) with one or more questions related to possible requisition types available for creation of the requisition (e.g., a job requisition). For example, one or more questions may be related to using a staffing agency (e.g., an agency staffing temporary workers) and/or an independent contractor(s) for completion of job duties. At operation 1020, an apparatus (e.g., computing device 200) may detect one or more answers to one or more of the questions presented via a user interface (e.g., wizard user interface 14). In some example embodiments, the apparatus may detect an answer(s) in response to detection of a selection of a button (e.g., button 5 of FIG. 5) by an entity (e.g., a hiring manager). At operation 1025, an apparatus (e.g., computing device 200) may filter available job/service classification options (e.g., administrative positions, seasonal positions, etc.). The filtered job classification options may be associated with one or more job positions (e.g., a receptionist position, an administrative assistant position, etc.) that the apparatus determines are more relevant to a job/service classification (e.g., administrative). At operation 1030, an apparatus (e.g., computing device 200) may receive a selection, via a user interface, of a job position associated with the filtered job classifications. In some examples, the selection of the job position may be by an entity (e.g., a hiring manager) via the user interface. At operation 1035, an apparatus (e.g., computing device 200) may generate and present a job requisition form (e.g., via a user interface) indicating an associated requisition type, job classification and/or job category related information to a display device. In some example embodiments, the apparatus may present the job requisition form to a display (e.g., display 205) of an electronic device (e.g., electronic device 105) of an entity (hiring manager). At operation 1040, upon detection of completion of the job requisition form (e.g., by an entity (e.g., the hiring manager)), an apparatus (e.g., computing device 200) may submit the job requisition form for approval via a user interface (e.g., approval workflow user interface 20). In some example embodiments, the approval may be by one or more entities (e.g., management and/or human resources of an organization). At operation 1045, an apparatus (e.g., computing device 200) may determine whether the submitted job requisition form has been approved (e.g., by management and/or human resources) (see FIGS. 12A, 12B and 12C illustrating an exemplary completed wizard interface 13 for the approved job requisition form). In an instance in which the apparatus determines that the job requisition form has not been approved, the apparatus may notify (e.g., by generating an electronic message) an entity (e.g., a hiring manager) at operation 1050 and the method returns to operation 1010. In an instance in which the apparatus (e.g., computing device 200) determines that the job requisition form has been approved, the method proceeds to operation 1055 in which the apparatus may generate a job requisition associated with the approved job requisition form. At operation 1060, an apparatus (e.g., computing device 200) may generate a workflow user interface (e.g., wizard interface 11) to identify and/or hire a candidate to fill the job position according to the generated job requisition form.

Figure 11:
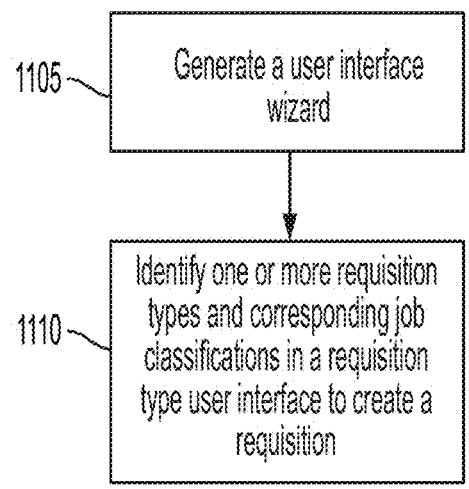
FIG. 11 is a flow diagram illustrating an exemplary method for generating a job requisition using a requisition creation workflow user interface according to one more exemplary embodiments of the present disclosure.

FIG. 11 is an exemplary flow diagram illustrating an exemplary method for generating a requisition according to one or more exemplary embodiments. At operation 1105, an apparatus (e.g., computing device 200) may generate a user interface wizard including one or more questions associated with respective requisition types to generate corresponding requisitions (e.g., a job requisitions) in response to receiving a request to create a requisition. In one example embodiment, the apparatus may generate a user interface wizard in response to detection of a request (e.g., via a generated message) to create a requisition sent by an electronic device (e.g., electronic device 100) of an entity (e.g., a hiring manager). At operation 1110, the apparatus may automatically identify one or more requisition types and corresponding job classifications in a requisition type user interface for selection in order to create a respective requisition. The generated user interface wizard may be provided to a display device (e.g., display 205) for display.

The exemplary embodiments may reduce improper requisition creation by hiring managers which may lead to disapproval of the requisition by management and/or human resources of an organization. Accordingly, the exemplary embodiments may allow a manager to identify a requisition type of a requisition during a requisition creation process based in part on using one or more questions and/or descriptive prompts and may generate a requisition based on a selected requisition type. In this regard, a requisition user interface may provide one or more prompts for selection (e.g., textual prompts). Each of the one or more prompts may be associated with a given active requisition type.

The exemplary embodiments may also facilitate association of a job/service classification to more than one requisition type. A requisition type field may be used to indicate all requisition types that each job/service classification is associated with, which may be in alphabetical order in some example embodiments. In some other alternative exemplary embodiments, requisition types that each job/service classification is associated with, may be in an order other than an alphabetical order. A requisition type filter may also be used to indicate each requisition type in a selected requisition type group that has one or more associated job/service classifications. In addition, one or more requisition type wizard questions may be utilized in part to identify one or more relevant requisition types.

CONCLUSION

Many modifications and other embodiments of the present disclosures set forth herein will come to mind to one skilled in the art to which these present disclosures pertain having the benefit of the teachings presented in the foregoing descriptions and the associated drawings. Therefore, it is to be understood that the present disclosures are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. An apparatus comprising a processor and a memory, the memory storing computer-executable instructions which when executed by the processor, cause the apparatus to perform operations comprising:
   presenting a user interface comprising one or more predefined questions associated with respective requisition types, in response to receiving a request to create a requisition, wherein each respective requisition type is associated with a set of rules to generate a requisition;
   in response to detecting at least one answer to at least one of the questions, automatically identifying a requisition type and filtering a set of job classification options based on the at least one detected answer; and
   presenting the filtered job classification options and one or more job categories in a requisition type user interface for selection in order to create a respective requisition based on the identified requisition type, a selected job classification or a selected job category.

2. The apparatus of claim 1, wherein prior to presenting the user interface, the instructions when executed further causes the apparatus to perform operations comprising:
   developing the one or more questions in a create requisition user interface during an initial stage of creating a corresponding requisition and assigning the one or more questions to a respective requisition type.

3. The apparatus of claim 2, wherein the one or more questions correspond to at least one job classification and job category associated with the respective requisition type.

4. The apparatus of claim 3, wherein the instructions when executed further causes the apparatus to perform operations comprising:
   generating a user interface indicating one or more competencies for selection associated with the job classification or the job category corresponding to the respective requisition, the competencies correspond to one or more skills of a job position associated with the respective requisition.

5. The apparatus of claim 1, wherein the instructions when executed further causes the apparatus to perform operations comprising:
generating a user interface indicating criteria to identify one or more candidates for a job position associated with the respective requisition.

6. The apparatus of claim 1, wherein the instructions when executed further causes the apparatus to perform operations comprising:
utilizing the one or more questions to identify a requisition type group, among a plurality of requisition type groups, for association with the respective requisition.

7. The apparatus of claim 6, wherein each of the plurality of requisition type groups are associated with corresponding job positions.

8. A method comprising:
presenting generating a user interface comprising one or more predefined questions associated with respective requisition types, in response to receiving a request to create a requisition, wherein each respective requisition type is associated with a set of rules to generate a requisition;
in response to detecting at least one answer to at least one of the questions, automatically identifying a requisition type and filtering a set of job classification options based on the at least one detected answer; and
presenting the filtered job classification options and one or more job categories in a requisition type user interface for selection in order to create a respective requisition based on the identified requisition type, a selected job classification or a selected job category.

9. The method of claim 8 further comprising:
developing the one or more questions in a create requisition user interface during an initial stage of creating a corresponding requisition and assigning the one or more questions to a respective requisition type, prior to presenting the user interface.

10. The method of claim 9, wherein the one or more questions correspond to at least one job classification and job category associated with the respective requisition type.

11. The method of claim 10 further comprising:
generating a user interface indicating one or more competencies for selection associated with the job classification or the job category corresponding to the respective requisition, the competencies correspond to one or more skills of a job position associated with the respective requisition.

12. The method of claim 8 further comprising:
generating a user interface indicating criteria to identify one or more candidates for a job position associated with the respective requisition.

13. The method of claim 8 further comprising:
utilizing the one or more questions to identify a requisition type group, among a plurality of requisition type groups, for association with the respective requisition.

14. The method of claim 13, wherein each of the plurality of requisition type groups are associated with corresponding job positions.

15. A computer program product storing computer executable instructions that when executed by a computing device cause said computing device to effectuate operations comprising:
presenting a user interface comprising one or more predefined questions associated with respective requisition types, in response to receiving a request to create a requisition, wherein each respective requisition type is associated with a set of rules to generate a requisition;
in response to detecting at least one answer to at least one of the questions, automatically identifying a requisition type and filtering a set of job classification options based on the at least one detected answer; and
presenting the filtered job classification options and one or more job categories in a requisition type user interface for selection in order to create a respective requisition based on the identified requisition type, a selected job classification, or a selected job category.

16. The computer program product of claim 15, wherein prior to presenting the user interface, the instructions when executed further effectuate operations comprising:
developing the one or more questions in a create requisition user interface during an initial stage of creating a corresponding requisition and assigning the one or more questions to a respective requisition type.

17. The computer program product of claim 15, wherein the instructions when executed further effectuate operations comprising:
generating a user interface indicating criteria to identify one or more candidates for a job position associated with the respective requisition.

18. The computer program product of claim 15, wherein the instructions when executed further effectuate operations comprising:
utilizing the one or more questions to identify a requisition type group, among a plurality of requisition type groups, for association with the respective requisition.

19. The computer program product of claim 18, wherein each of the plurality of requisition type groups are associated with corresponding job positions.

20. The computer program product of claim 16, wherein the one or more questions correspond to at least one job classification and job category associated with the respective requisition type.

* * * * *